(12) United States Patent
Fu et al.

(10) Patent No.: US 12,085,403 B2
(45) Date of Patent: Sep. 10, 2024

(54) VEHICLE LOCALISATION

(71) Applicant: ZENSEACT AB, Gothenburg (SE)

(72) Inventors: Junsheng Fu, Nödinge (SE); Han Zhang, Shanghai (CN); Tony Gustafsson, Askim (SE); Andreas Schindler, Gothenburg (SE); Eduardo Sesma Caselles, Västra Frölunda (SE); Erik Steinmetz, Landvetter (SE); Pontus Kielén, Mölndal (SE); Axel Beauvisage, Gothenburg (SE); Joakim Lin Sörstedt, Gothenburg (SE)

(73) Assignee: ZENSEACT AB, Gothenburg (SE)

( * ) Notice: Subject to any disclaimer, the term of this patent is extended or adjusted under 35 U.S.C. 154(b) by 330 days.

(21) Appl. No.: 17/562,478

(22) Filed: Dec. 27, 2021

(65) Prior Publication Data
US 2022/0205804 A1  Jun. 30, 2022

(30) Foreign Application Priority Data

Dec. 28, 2020 (EP) .................................. 20217372

(51) Int. Cl.
*G01C 21/36* (2006.01)
*B60W 40/10* (2012.01)

(52) U.S. Cl.
CPC ......... *G01C 21/3638* (2013.01); *B60W 40/10* (2013.01); *G01C 21/3644* (2013.01); *G01C 21/3694* (2013.01); *B60W 2420/403* (2013.01)

(58) Field of Classification Search
CPC ............ G01C 21/3638; G01C 21/3644; G01C 21/3694; B60W 40/10; B60W 2420/403
See application file for complete search history.

(56) References Cited

U.S. PATENT DOCUMENTS

2017/0169300 A1* 6/2017 Heisele .................... G06T 7/74
2018/0217612 A1* 8/2018 Vladimerou ....... G01C 21/3822
(Continued)

FOREIGN PATENT DOCUMENTS

CN  109815847 A  * 5/2019

OTHER PUBLICATIONS

English translation of CN-109815847-A (Year: 2019).*
European Search Report mailed Jul. 2, 2021 for European Application No. 20217372.0, 8 pages.

*Primary Examiner* — Anshul Sood
*Assistant Examiner* — Matthew Ho
(74) *Attorney, Agent, or Firm* — Sage Patent Group

(57) ABSTRACT

The present disclosure relates to a method for determining a vehicle pose, predicting a pose $(x_k, y_k, \theta_k)$ of vehicle on a map based on sensor data acquired by a vehicle localization system, transforming a set of map road references of a segment of a digital map from a global coordinate system to an image-frame coordinate system of a vehicle-mounted camera based on map data and predicted pose of the vehicle. The transformed set of map road references form a set of polylines in image-frame coordinate system. Identifying a set of corresponding image road reference features in an image acquired by vehicle mounted camera, where each identified road references feature defines a set of measurement coordinates $(x_i, y_i)$ in image-frame. Projecting each of identified set of image road reference features onto formed set of polylines in order to obtain a set of projection points.

13 Claims, 6 Drawing Sheets

(56) References Cited

U.S. PATENT DOCUMENTS

| | | |
|---|---|---|
| 2018/0293466 A1 | 10/2018 | Viswanathan |
| 2018/0307238 A1* | 10/2018 | Wisniowski ............ G01S 7/497 |
| 2020/0124421 A1 | 4/2020 | Kang et al. |
| 2020/0217972 A1* | 7/2020 | Kim .................... G01C 21/3602 |
| 2020/0218906 A1 | 7/2020 | Wang et al. |
| 2020/0324795 A1 | 10/2020 | Bojarski et al. |
| 2021/0019897 A1* | 1/2021 | Biswas ..................... G06T 7/11 |

* cited by examiner

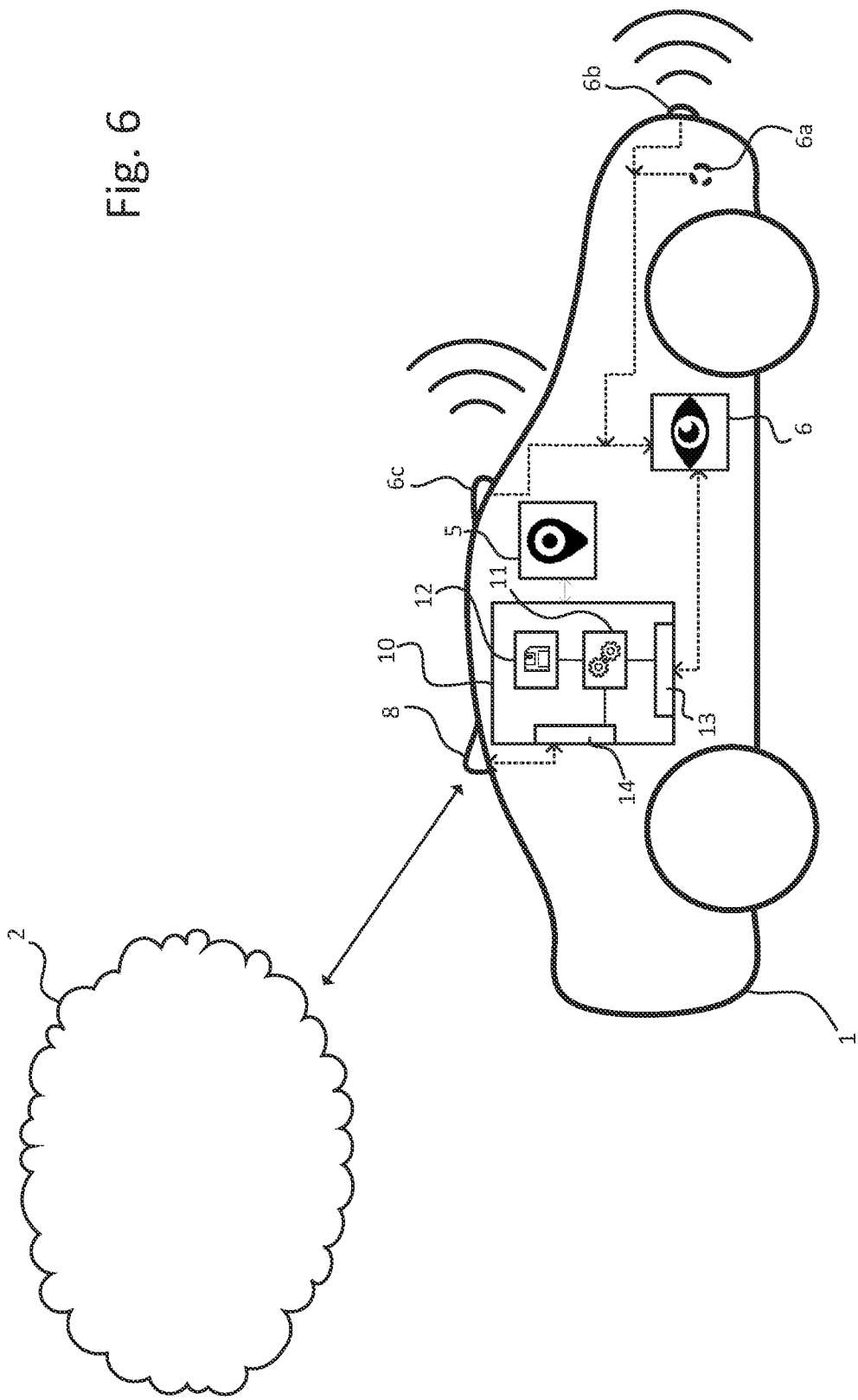

VEHICLE LOCALISATION

CROSS-REFERENCE TO RELATED APPLICATIONS

The present application for patent claims priority to European Patent Office Application Ser. No. 20217372.0, entitled "VEHICLE LOCALISATION" filed on Dec. 28, 2020, assigned to the assignee hereof, and expressly incorporated herein by reference.

TECHNICAL FIELD OF THE INVENTION

The present invention relates to the field of vehicle localization, and in particular to image-plane measurement updates for High Definition map (HD-map)—based localization.

BACKGROUND

During the last few years, the research and development activities related to autonomous vehicles has exploded in number and many different approaches are being explored. An increasing portion of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, there is ongoing research and development within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

An important requirement for autonomous and semi-autonomous vehicles is that they are able to estimate the pose of the vehicle with accuracy and consistency since this is an important safety aspect when the vehicle is moving within traffic.

Conventionally, satellite based positioning systems (Global Navigation Satellite Systems, GNSS), like for instance Global Positioning System (GPS), Globalnaya Navigazionnaya Sputnikovaya Sistema (GLONASS), Galileo, Beidou, have been used for positioning purposes. However, these and other regional systems are often not accurate enough to rely on solely for determining a position of a moving vehicle in autonomous applications. Moreover, GNSS based solutions have even less accuracy in determining height information.

Other solutions involve a combination of GNSS data together with vehicle IMU (inertial measurement unit) signals which often can suffer from large scale and bias errors resulting in positioning errors of several meters as well as errors in the orientation estimation. Additionally, these methods and systems do not work in scenarios of poor or no satellite connections such as in tunnels or close to tall buildings.

Alternatively, there are systems and methods which utilize HD-map information together with a number of different sensors to increase the reliability of the map position such as cameras, LIDAR, RADAR, and other sensors for determining vehicle travelling parameters such as speed, angular rate and so on. However, even given current vehicle pose (position and orientation), it is still hard to predict a robust vehicle pose estimation by only odometry due to the measurement noise from different measurement sensors, e.g. motion sensors.

To this end, solutions which employ a landmark based positioning approach are suggested. Here, external sensors are used to detect stationary objects (referred to as landmarks) whose geographical positions also are available in the HD map data. The vehicle's position is then estimated by sequentially comparing the sensor data with where these landmarks are according to the map. Examples of landmarks that both typically are available in an HD-map, and detectable by most automotive grade sensors are for example traffic signs and traffic lights.

However, there is still a need in the art for new and improved solutions for accurate vehicle localization in autonomous applications. As always, the improvement in performance shall preferably be made without significant impact on the size, power consumption and cost of the on-board system or platform.

SUMMARY OF THE INVENTION

It is therefore an object of the present invention to provide a method for determining a vehicle pose, a corresponding computer-readable storage medium, a device for determining a vehicle pose, and a vehicle comprising such a device, which alleviate all or at least one of the drawbacks of presently known solutions.

This object is achieved by means of a method for determining a vehicle pose, a corresponding computer-readable storage medium, a device for determining a vehicle pose, and a vehicle comprising such a device as defined in the appended claims. The term exemplary is in the present context to be understood as serving as an instance, example or illustration.

According to a first aspect of the present invention, there is provided a method for determining a vehicle pose. The method comprises predicting a pose $(x_k, y_k, \theta_k)$ of the vehicle on a map based on sensor data acquired by a vehicle localization system. The method further comprises transforming a set of map road references of a segment of a digital map from a global coordinate system to an image-frame coordinate system of a vehicle-mounted camera based on map data and the predicted pose of the vehicle. The transformed set of map road references form a set of polylines in the image-frame coordinate system. Moreover, the method comprises identifying a set of corresponding image road reference features in an image acquired by the vehicle mounted camera, where each identified road references feature defines a set of measurement coordinates ($x_i$, $y_i$) in the image-frame. The method further comprises projecting each of the identified set of image road reference features onto the formed set of polylines in order to obtain a set of projection points, wherein each projection point defines a set of projection coordinates ($x^p_i$, $y^p_i$). Further, the method comprises determining an error parameter based on a difference between the measurement coordinates and the corresponding projection coordinates, and updating the predicted pose based on the determined error parameter.

In other words, the above proposed method may be understood as vehicle localization method generally defining a "prediction" and "measurement update" process, which are used to estimate a current pose of the vehicle. In short, the "prediction" is performed based on the information "owned" by the vehicle itself (e.g. speed, acceleration, etc.). For example, if the vehicle keeps moving at the current speed and acceleration for 1 second, where would it be? The "measurement update" is performed based on the information of the environment and surroundings gathered by the vehicle-mounted sensors. Here, the measurement update can be construed as a process for "correcting" the errors introduced in the prediction by comparing the observed surroundings with the "known" digital map.

In particular, in the herein proposed vehicle localization method, the "measurement update" is performed in an image-frame coordinate system, which alleviates drawbacks related to error propagation due to depth errors in mono-depth estimations. Moreover, by generating polylines to represent the transformed map road references in the image-frame coordinate system the measured/identified image road references may be validated in an efficient and robust manner, increasing the accuracy of the whole vehicle localization method.

According to a second aspect of the present invention, there is provided a (non-transitory) computer-readable storage medium storing one or more programs configured to be executed by one or more processors of a vehicle localization module, the one or more programs comprising instructions for performing the method according to any one of the embodiments disclosed herein. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further, in accordance with a third aspect of the present invention there is provided a device for determining a vehicle pose, where the device comprises control circuitry. The control circuitry is configured to predict a pose ($x_k$, $y_k$, $\theta_k$) of the vehicle on a map based on sensor data acquired by a vehicle localization system. Further, the control circuitry is configured to transform a set of map road references of a segment of a digital map from a global coordinate system to an image-frame coordinate system of a vehicle-mounted camera based on map data and the predicted pose of the vehicle. The transformed set of map road references form a set of polylines in the image-frame coordinate system. The control circuitry is further configured to identify a set of corresponding image road reference features in an image acquired by the vehicle mounted camera, where each identified image road references feature defines a set of measurement coordinates ($x_i$, $y_i$) in the image-frame. Moreover, the control circuitry is configured to project each of the identified set of road reference features onto the formed set of polylines in order to obtain a set of projection points, wherein each projection point defines a set of projection coordinates ($x^p_i$, $y^p_i$), determine an error parameter based on a difference between the measurement coordinates and the corresponding projection coordinates, and to update the predicted pose based on the determined error parameter. With this aspect of the invention, similar advantages and preferred features are present as in the previously discussed first aspect of the invention.

Yet further, in accordance with a fourth aspect of the present invention, there is provided a vehicle comprising a localization system for monitoring a position of the vehicle, a vehicle-mounted camera for capturing images of a surrounding environment of the vehicle, and a device for determining a vehicle pose according to any one of the embodiments disclosed herein. With this aspect of the invention, similar advantages and preferred features are present as in the previously discussed first aspect of the invention.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF FIGURES

Further objects, features and advantages of embodiments of the invention will appear from the following detailed description, reference being made to the accompanying drawings, in which:

FIG. 6 is a schematic side-view illustration of a vehicle comprising a device for determining a vehicle pose in accordance with an embodiment of the present disclosure.

DETAILED DESCRIPTION

Figure 1:
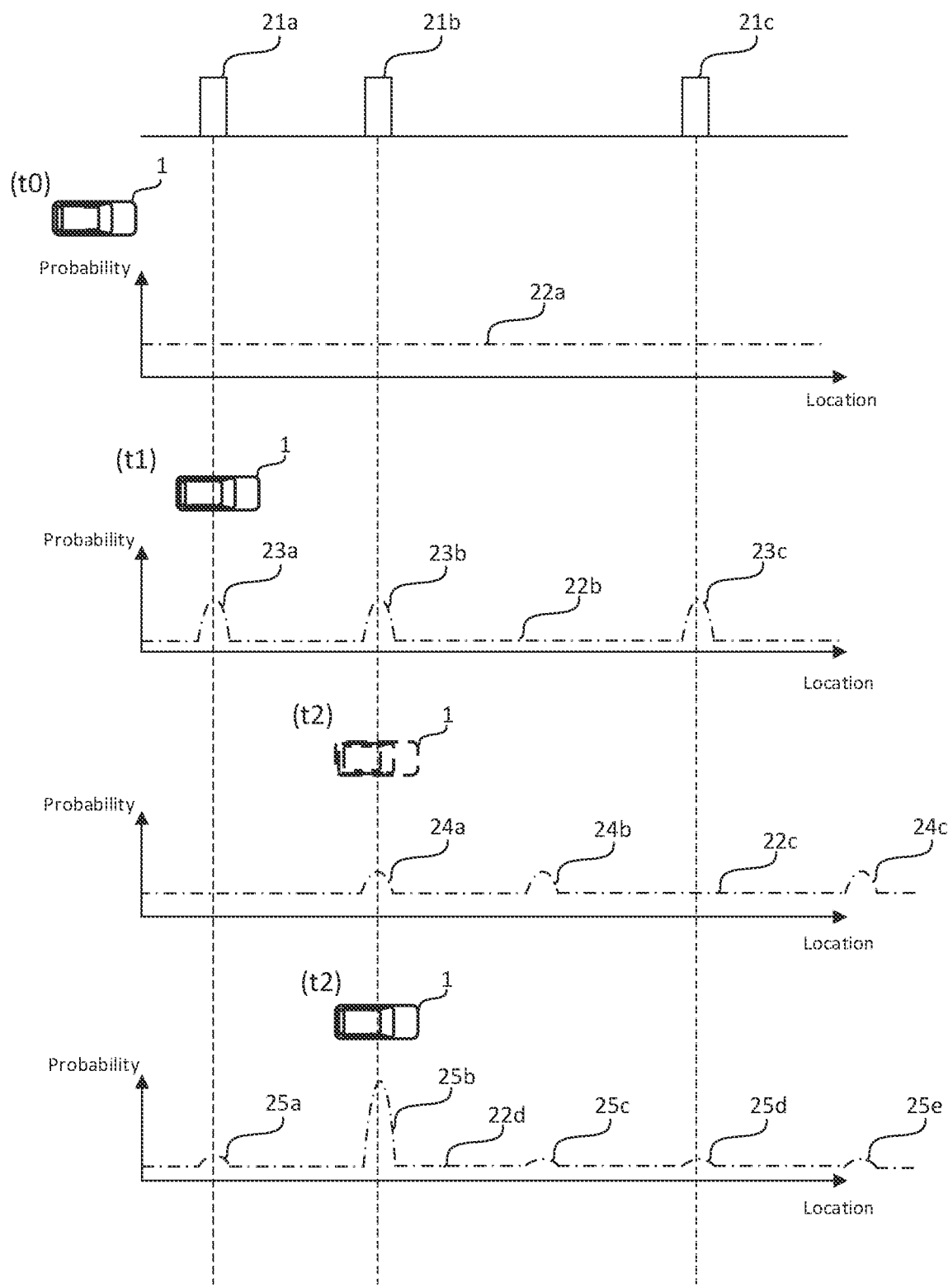
FIG. 1 is schematic illustration of a measurement update and prediction process for vehicle localization in one dimension (1D).

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present invention is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 is a schematic illustration of a simplified localization process in one dimension (1D) that serves to facilitate the understanding of present disclosure. In more detail, FIG. 1 serves to illustrate the "prediction" and "measurement update" steps of vehicle localization method.

In FIG. 1, a vehicle 1 is moving through a corridor that has three doors 21a-c. The vehicle is provided with a localization module configured to provide an estimation of the vehicle's 1 position in the corridor. As mentioned, this a simplified example where it is assumed that the vehicle 1 can only travel in one direction along the corridor, and that it has only one sensor that is configured to determine if there is a door 21a-c to the left of the vehicle 1.

At a first point in time (to), the vehicle 1 has not started to move yet, and the estimation 22a of the vehicle's position within the corridor is a uniform distribution as indicated in the first graph. In other words, the localization module is not able to accurately estimate the vehicle's 1 position in the corridor at time to.

At a subsequent point in time ($t_1$) the localization module reaches the first door 21a and performs a measurement update. The vehicle's sensor detects the presence of a door to the left. The localization module has map data indicative of the number of doors 21a-c and of the positions of the doors 21a-c in the corridor, and can therefore determine with a certain probability that the vehicle 1 is next to one of the doors 21a-c, though the localization module cannot determine next to which of the three doors 21a-c. Therefore, the localization module determines that there is an increased probability 23a-c that the vehicle 1 is next to one of the doors 21a-c in the corridor, and that there is a decreased probability that the vehicle 1 is in any other position in the corridor, as indicated in the second graph 22b from the top.

The vehicle 1 continues to move along the corridor at a certain speed for a certain amount of time, e.g. 1 m/s for two seconds, and the location of the vehicle 1 is predicted for a subsequent moment in time ($t_2$). If the speed and time estimations would be exact, the vehicle 1 would in this case have moved 2 meters, and the peaks 23a-c in the localization probabilities from the preceding point in time ($t_{1m}$) should have shifted 2 meters forward. However, due to uncertainties in the speed estimation and timer, the height of the peaks 23a-c will decrease as indicated by the peaks 24a-c of the probability distribution 22c.

Further, the localization module of the vehicle 1 reaches the second door at time t2 and performs another measurement update. Here, the sensor detects the presence of a door to the left side of the vehicle 1, and the localization module updates the estimate 22d of the vehicle's current location. This may for example be done by multiplying the probability distribution 22c from the prediction step with the probability distribution of the second measurement step (which would be similar to the distribution 22b) resulting the location estimation 22d as presented in the lowermost graph in FIG. 1. In more detail, the probability distribution 22d of the vehicle's 1 location in the corridor has several "bumps" 25a, 25c, 25d, 25e and a single "peak" 25b at the location corresponding to the right of the second door 21b.

Accordingly, the localization module may the conclude that there is a high likelihood (e.g. above some threshold) that the vehicle 1 is next to the second door 21b, and that it is far more likely than any other possible position in the corridor. Thus, the localization module may output a signal indicative of that the vehicle 1 is located next to the second door 21b at time $t_2$.

The above described process is accordingly performed iteratively or in a "looped" manner at a specified frequency so that the localization module continuously predicts the vehicle's 1 position based on sensor information of the vehicle's 1 motion and a vehicle motion model, and then performs measurement updates based the vehicle's perception data and map data so to correct the predicted locations. In other words, the "prediction" is performed based on the "internal information" of the vehicle 1 (e.g. speed, acceleration, etc.). For example, predictions are based on reasoning such as: if the vehicle 1 keeps moving at the current speed and acceleration for 1 second, where would it be? On the other hand, the "measurement update" is performed based on perception, i.e. based on the environment and surroundings gathered by the vehicle's perception system (e.g. detection of doors to the left of the vehicle in the illustrated example of FIG. 1). The measurement update is then used for "correcting" the errors introduced in the prediction by comparing the observed surroundings with map data (e.g. HD-map data).

Figure 2:
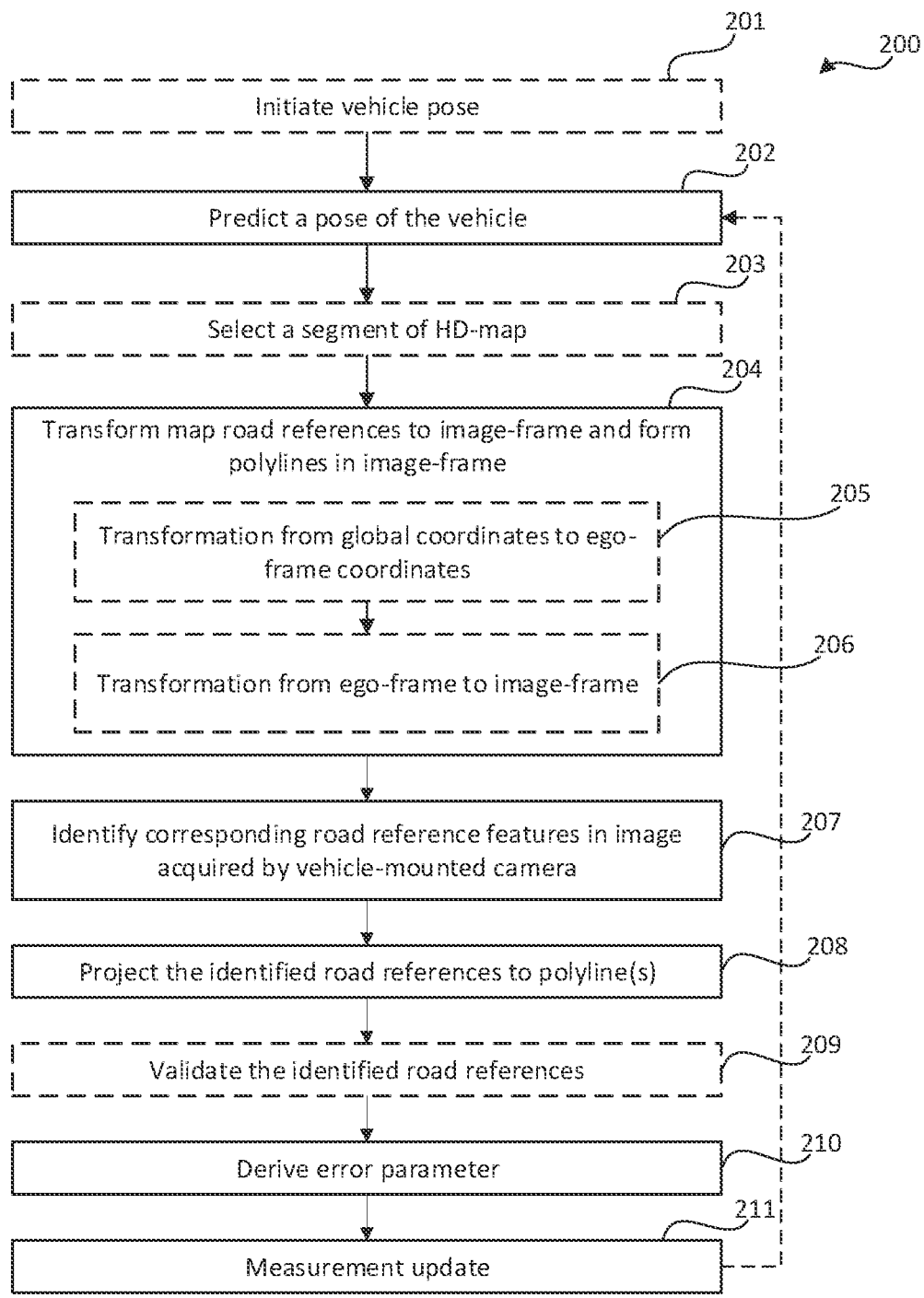
FIG. 2 is a schematic flow chart representation of a method for determining a vehicle pose in accordance with an embodiment of the present invention.

FIG. 2 is a schematic illustration of a method 200 for determining a vehicle pose in accordance with some embodiments. A pose may be understood as a position and an orientation of the ego-vehicle, and is in some embodiments represented by a 2D Cartesian position and a yaw of the vehicle (x, y, θ). However, in some embodiments, the pose is a 6D pose where the position is defined by a 3D Cartesian position and the orientation is defined by a roll, pitch, and yaw of the vehicle. The method 200 may comprise an optional step of initializing 201 a vehicle pose based on Global Navigation Satellite System (GNSS) data and map data. The initiation 201 may for example be performed by utilization of a suitable satellite based positioning systems, such as e.g. a GNSS or a corresponding regional system such as e.g. a Global Positioning System (GPS), Globalnaya Navigazionnaya Sputnikovaya Sistema (GLONASS), Galileo, Beidou, etc.

Further, the method 200 comprises predicting 202 a pose of the vehicle (xk, yk, θk) based on sensor data acquired by a vehicle localization system. The vehicle localization system may for example comprise an Inertial Measurement Unit (IMU). An IMU may be understood as a device configured to detect linear acceleration using one or more accelerometers and rotational rate using one or more gyroscopes. Thus, in some embodiments, the sensor data may be in the form of sensor data obtained from an IMU. The output from the IMU is then used to estimate a change in the vehicle's pose over time. In more detail, the prediction 202 of the vehicle's pose may be estimated based on a vehicle motion model together with motion sensor data (e.g. data from accelerometers and gyroscopes, which will herein collectively be referred to as motion sensors). Moreover, the prediction 202 of the pose of the vehicle may be performed using a Bayesian filter.

Still further, the method 200 comprises transforming a set of map road references of (at least) a segment of a digital map from a global coordinate system to an image-frame coordinate system of a vehicle-mounted camera based on map data and the predicted pose of the vehicle. A map road reference is in the present context to be understood as a longitudinally repetitive road reference such as e.g. lane markers, road edges, road barriers, etc. whose positions in the map are indicated in the map data. The transformed 204 set of map road references form a set of polylines in the image-frame coordinate system. It should be noted that "a set" as used herein (e.g. a set of map road references, a set of polylines, etc.) is to be interpreted as "one or more". A polyline may be understood as a list of points, where line segments are drawn between consecutive points. In other words, a polyline is a connected sequence of line segments created as a single object.

However, in some embodiments, the step of transforming 204 the set of map road references comprises converting 205 the set of map road references into an ego-frame coordinate system and then transforming 206 the converted set to the image-frame coordinate system. More specifically, the set of map road references of the segment of the digital map are converted 205 from the global coordinate system into an ego-frame coordinate system of the vehicle based on map data and the predicted pose. Thus, once a predicted pose of the vehicle is known, one can use this to effectively transform 205 the map road references as provided by the digital map to a local coordinate system of the vehicle (i.e. the ego-frame coordinate system). Then, the converted 205 set of map road references are transformed 206 from the ego-frame coordinate system to the image-frame coordinate system based on a set of calibration parameters of the vehicle-mounted camera. The calibration parameters may comprise extrinsic parameters (may also be referred to as "camera pose") and/or intrinsic parameters (e.g. focal length, lens distortion, etc.). In more detail, extrinsic parameters define the location and orientation of the camera with respect to the ego-frame, while intrinsic parameters allow a mapping between camera coordinates and pixel coordinates in the image frame. Thus, extrinsic parameters are external to the camera and may change with respect to the world frame, and intrinsic parameters are camera parameters that are internal and fixed to a particular camera/digitization setup. The terms convert and transform are used interchangeably in reference to coordinate-transformations and serve mainly to facilitate the understanding of the present disclosure.

Figure 3A:
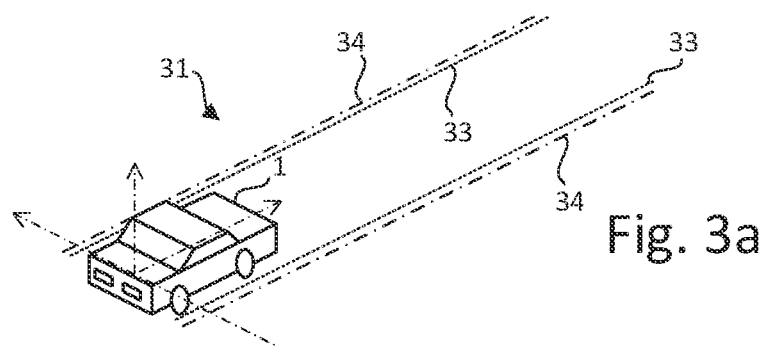
FIG. 3a is a schematic perspective view of a vehicle on a road portion with lane-traces.
Figure 3B:
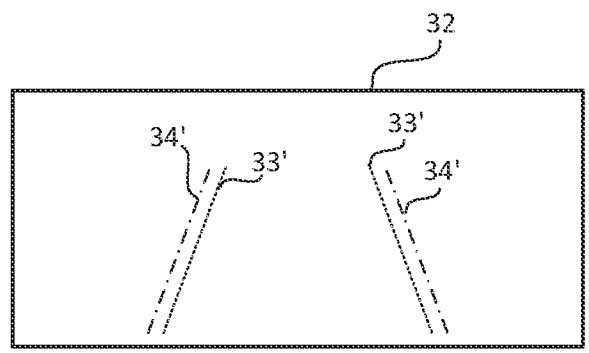
FIG. 3b is a schematic illustration of the lane traces from FIG. 3a in an image-frame coordinate system.

Turning briefly to FIGS. 3a and 3b, which serve to illustrate the terms "ego-frame coordinate system" 31 and "image-frame coordinate system" 32, respectively. Accordingly, FIG. 3a is a perspective view of a vehicle 1 where lane markers as provided by the HD-map are depicted as dashed lines 34 while the lane markers as provided by the vehicle's perception system are depicted as dotted lines 33. Here, in FIG. 3a, the HD-map data 34 together with the perception output 33 are transformed to the ego-frame 31. The perception output may for example be in the form of lane tracing made by means of camera images. The ego-frame coordinate system may for example be a Cartesian coordinate system with an origin in the centre of the rear axis of the vehicle 1 (or any other suitable origin as known in the art). Similarly, in FIG. 3b, the corresponding data is displayed in the image-frame 32, where the HD-map data 34 is transformed to the image-frame 32. The image-frame coordinate system 32 may then be interpreted as a 2D coordinate system with an origin at the top-left corner (or any other suitable origin as known in the art). Stated differently, the image-frame 32 is a coordinate system that measures pixel locations in the image plane (i.e. the plane on which the image is formed).

Turning back to FIG. 2, the method 200 further comprises identifying 207 corresponding image road reference features in an image acquired by the vehicle mounted camera, where each identified road reference feature defines a set of measurement coordinates $(x_i, y_i)$ in the image-frame. Accordingly, if the right-side lane markers are used as the map road references, then the right-side lane markers are identified 207 in the image acquired by the vehicle-mounted camera. Analogously, if a left-side road barrier is used as the map road reference, then the left-side road barrier is identified 207 in the image acquired by the vehicle-mounted camera, and so forth. Further, each of the identified 207 set of image road reference features are projected onto the formed set of polylines in order to obtain a set of projection points. Each projection point defining a set of projection coordinates $(x^P_i, y^P_i)$.

Figure 4:
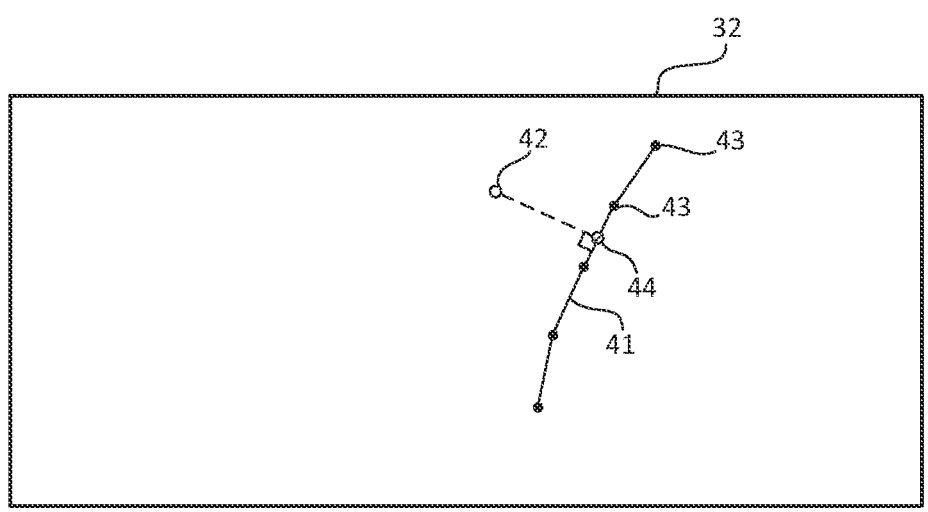
FIG. 4 is a schematic illustration of a transformed set of map road references forming a polyline and a corresponding image road reference that is projected onto the polyline in accordance with an embodiment of the present invention.

Turning briefly to FIG. 4, which illustrates an identified road reference feature 42, a set of transformed map road references 43 forming a polyline 41, and a projection point 44 of the identified road reference feature onto the polyline 41 in an image-frame 32. Going along with the abovementioned example, the map road references 43 may be the right-side lane markers obtained from a digital map (e.g. HD-map) that have been transformed to the image-frame 32. Accordingly, in order to obtain the projection point 44, the identified road reference feature (i.e. a right-side lane marker identified in an image acquired by the vehicle-mounted camera) is orthogonally projected onto the polyline 41. In other words, in some embodiments, the step of projecting the set of identified road reference features comprises, for each identified image road reference feature, defining a closest index of each polyline 41 relative to the image road reference feature 42 as the projection point 44 for that image road reference feature 42.

In other words, the white dot 42 is an image road reference feature pixel (e.g. a lane marker feature pixel) with a set of measurement coordinates (xi, yi) extracted by a perception module of the vehicle from a raw video image frame of the vehicle-mounted camera. Thus, given that one has the predicted pose of the vehicle at the moment in time that the image road reference feature pixel is extracted, the map road reference features are extracted from the digital map based on the predicted vehicle pose an indicated as black dots 43 in FIG. 4. In more detail, the map road reference features (e.g. lane markers) are presented as indices of a polyline 41.

Reverting to FIG. 2, the method 200 further comprises determining 210 an error parameter based on a difference between the measurement coordinates ($x_i$, $y_i$) and the corresponding projection coordinates ($x^p_i$, $y^p_i$), and updating 211 the predicted 202 pose based on the determined 210 error parameter. In more detail, the error parameter may be derived 210 from:

$$\begin{bmatrix} x_1 - x_1^p \\ y_1 - y_1^p \\ x_2 - x_2^p \\ y_2 - y_2^p \\ \vdots \\ x_N - x_N^p \\ y_N - y_N^p \end{bmatrix}$$

and then used to perform the measurement update 211. Thus, the Euclidian distance between each set of measurement coordinates and the corresponding projection coordinates is given by $\sqrt{(x_i-x_i^p)^2+(y_i-y_i^p)^2}$. More specifically, the updating 211 of the predicted 202 pose may for example be done through linear or non-linear filtering based on the predicted 202 pose and the determined 210 error parameter. A filter in this context may for example be a Bayesian filter such as e.g. a Kalman filter, an extended Kalman filter, a cubature Kalman filter (CKF), or a particle filter.

Turning to FIG. 4 again, the transformed map road reference features 43 to the image-frame may be understood as an assumption of what vehicle mounted camera should capture at the moment in time that the vehicle is estimated to be in the predicted pose. However, the difference between that assumption (i.e. the black dots) and the actual measurement (i.e. the white dot) is the basis for performing the measurement update. More specifically, in order to determine the error parameter, an orthogonal projection from the image road reference feature 42 to the polyline 41 in order to obtain a projection point 44 having a set of projection coordinates ($x^p_i$, $y^p_i$). Given the extracted/identified road reference feature 42 and the predicted vehicle pose, the projection point 44 corresponds to the image frame road reference feature that one "expected" the vehicle-mounted camera to "see". Thus, given the difference between the measured value 42 and the expected value 44, an error value can be derived, and the "measurement update" can be performed.

In short, the herein proposed localization method generally comprises two main steps, namely "prediction" and "measurement update". In order to perform the latter step, a "measurement model" is defined, which models "What are the sensors mounted on the vehicle supposed to measure given the vehicle is at some place?". This is often referred to as "predicted measurements".

As an optional step, the method 200 may further comprise selecting 203 the segment of the digital map based on the predicted pose of the vehicle and a set of properties of the vehicle-mounted camera. More specifically, since the measurement update is performed by checking the local environment around the vehicle against the HD map it is not necessary to transform the entire HD map into the image frame but only a suitably selected segment of the HD map. Therefore, the selection of the segment may be based on a set of properties of the camera indicative of the camera's sensing range or field of view. In other words, in some embodiments, essentially only the area of the map that can be detected by the vehicle-mounted camera area transformed at a given moment in time. However, in some embodiments, the selection 203 of the segment of the digital map may be based on other criteria (e.g. anything within predefined ranges of the ego-vehicle frame).

Figure 5A:
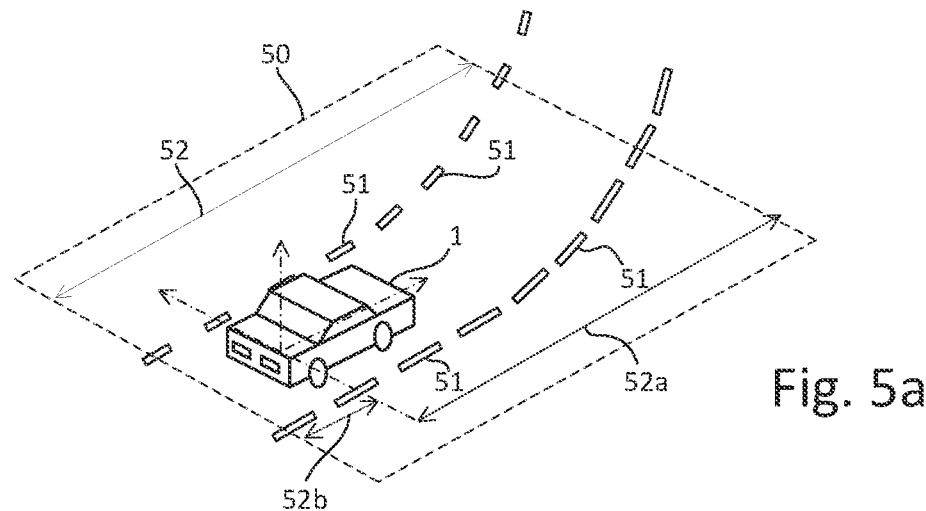
FIG. 5a is a schematic perspective view of a vehicle on a segment of a digital map in accordance with an embodiment of the present invention.

FIG. 5a is a schematic perspective view illustration of a vehicle 1 traveling on a road portion of a digital map having a set of road references in the form of lane markers 51. Moreover, FIG. 5a indicates how the selection of the segment 50 of the digital map may be controlled. As mentioned, the selection of the segment 50 may be based on a predefined range 52 in the ego-vehicle frame, where the three axes indicate the origin of the ego-vehicle frame at the centre of the rear axis of the vehicle 1. In more detail, the selection of the segment 50 of the digital map, whose road references 51 are to be transformed to an image-frame coordinate system, may be performed such that only the set of map road references that are within a predefined range on the x-axis of the ego-vehicle frame. In other words, the map road references that are within a first predefined distance 52a "in front of" the origin of the ego-vehicle frame and a second predefined distance 52b "behind" the origin of the ego-vehicle frame.

Reverting to FIG. 2, and in accordance with some embodiments, the method 200 may further comprise validating 209 the identified 207 set of image road references. The validation 209 provides advantages in terms of reduced errors in the measurement update 211 step due to an incorrectly calculated 210 error parameter. In more detail, since only a segment of the digital map is used for the transformation 204 of map road references, there is a risk of having image road reference features (i.e. road reference features picked-up by the vehicle mounted camera) falling out of "range" of the formed polyline(s). Moreover, in comparison to a single transformed map road references with a corresponding image road reference the utilization of polylines is more robust and simple and may provide further advantages in terms of a more precise error parameter computation.

Furthermore, the method 200 may comprise a step of looping or repeating the above described steps in a looped manner. In other words, the method 200 is looped at some frequency (e.g. 10-100 Hz) so that the pose prediction and subsequent measurement update steps are iteratively performed as the vehicle moves. Furthermore, the vehicle pose need not necessarily be a three-dimensional (3D) pose (lateral position, longitudinal position, yaw) but may in some embodiments be a six-dimensional (6D) pose (lateral position, longitudinal position, vertical position, roll, pitch, yaw).

Moreover, the same process 200 may be extended to include further vehicle states in addition to the pose ($x_k$, $y_k$, $\theta_k$). More specifically, in some embodiments, the prediction 202 further includes a prediction of a longitudinal velocity of the vehicle, a lateral velocity of the vehicle, a vertical velocity of the vehicle, and angular velocities of the vehicle (around the 3D axes). Accordingly, the subsequent steps are then based the predicted vehicle states and the predicted states are updated in an analogous manner as described in the foregoing.

Figure 5B:
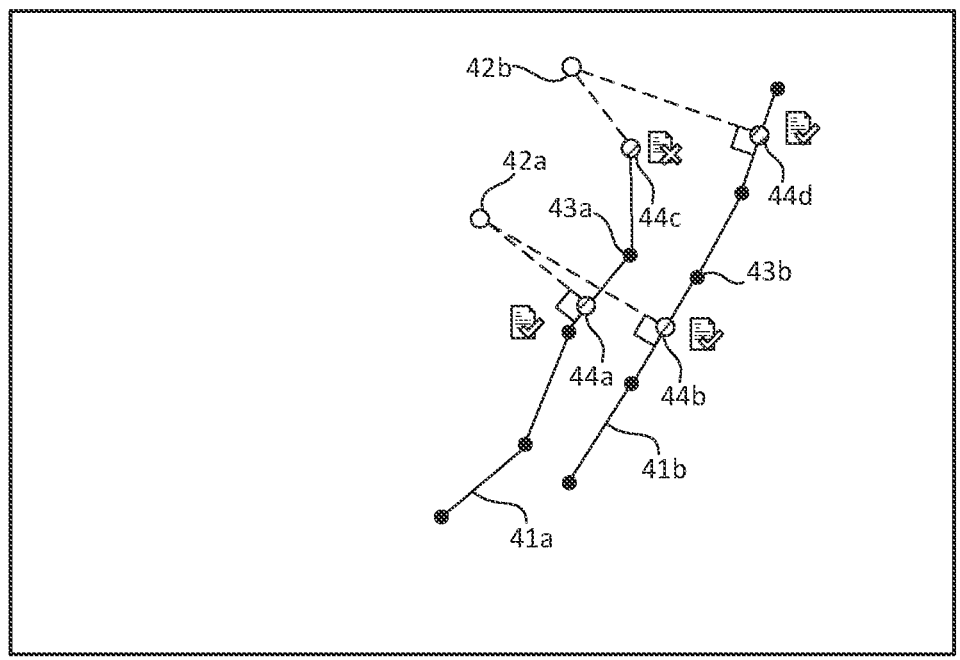
FIG. 5b is a schematic illustration of a transformed set of map road references forming two polylines and corresponding image road references that are projected onto the polylines for a validation process in accordance with an embodiment of the present invention.

The validation 209 procedure is further elucidated with reference to FIG. 5b which schematically illustrates two polylines 41a, 41b that are formed from a set of transformed map road references 43a, 43b and two image road reference features 42a 42b in an image-frame coordinate system.

The herein disclosed vehicle localization method 200 is based on a linear or non-linear filtering technique, and in accordance with some embodiments, on Bayesian filtering. Moreover, in some embodiments, the vehicle localization method 200 is based on a Cubature Kalman Filter (CKF), i.e. a variation of the Kalman filter. Therefore, in order to deal with the non-linearity of the prediction and measurement update modelling, the CKF perturbs the predicted vehicle pose and propagates the perturbed poses using prediction and measurement models, after which mean values of the propagated perturbations is derived. This mean values are then used to determine the predicted pose of the vehicle and to generate the transformed set of map road references 43a, 43b and the associated polylines 41a, 41b.

For the validation 209 procedure, a validity check is performed across all cubature points (i.e. based on all of the perturbed vehicle poses) since the transformed set of map road references 43a, 43b vary in dependence of the used cubature points (i.e. perturbed vehicle poses. Accordingly, in the illustrated example of FIG. 5b, the transformed set of map road references of the digital map segment resulted in the formation of two polylines 41a, 41b, where the indices 43a, 43b of the two polylines were transformed using different cubature points. As depicted in FIG. 5b, for some image road reference features, some projections may be valid for some cubature points and invalid for others. More specifically, the first image road reference feature 42a has two valid projection points 44a, 44b while the second image road reference 42b has one invalid projection point 44c and one valid projection point 44d. Since the second image road reference feature 42b has at least one invalid projection point 44c, that image road reference feature and its associated projection points are discarded (or simply not considered) for the error parameter calculation.

In other words, the validation of the identified set of image road reference features 42a, 42b may be performed by, for each image road reference feature, discarding the image road reference features and the associated projection points if one of the associated projection points is a non-orthogonal projection point. Accordingly, the determination of the error parameter is only based on a difference between the measurement coordinates of validated image road reference features and the corresponding projection coordinates. Moreover, the formation of polylines from the transformed map road references provides technical benefits for the validation procedure as invalid image road references (i.e. extracted/measured road references from camera output) can be discarded, by simple and efficient means, resulting in a more accurate localization estimation of the vehicle.

Figure 5C:
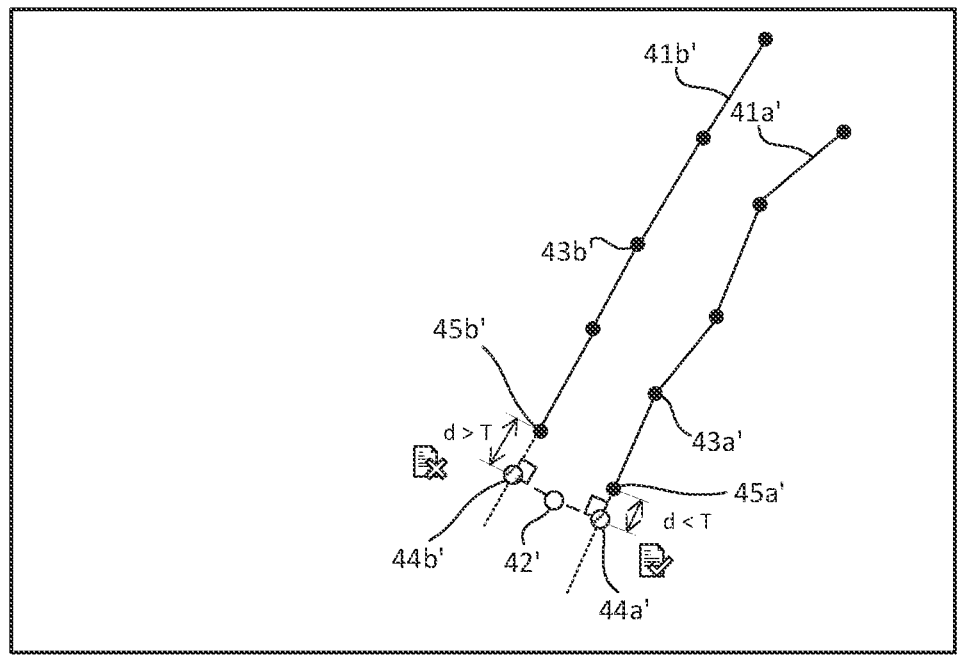
FIG. 5c is a schematic illustration of a transformed set of map road references forming two polylines and a corresponding image road reference that is projected onto extensions of the polyline for a validation process in accordance with an embodiment of the present invention.

Further, an alternative validation process of the identified set of image road reference features 42' is illustrated in FIG. 5c. As before, a validity check is performed across all cubature points (i.e. based on all of the perturbed vehicle poses) since the transformed set of map road references 43a', 43b' vary in dependence of the used cubature points (i.e. perturbed vehicle poses. Accordingly, in the illustrated example of FIG. 5c, the transformed set of map road references of the digital map segment resulted in the formation of two polylines 41a', 41b', where the indices 43a', 43b' of the two polylines were transformed using different cubature points.

Here, the image road reference feature 42' has no projections points that can be orthogonally projected onto the polylines 41a', 41b'. Instead, the two projection points 44a', 44b' are generated by extending the polylines 41a', 41b' as indicated by the dotted line. The extensions of the polylines 41a', 41b' may be considered to constitute a portion of the polyline. In order to check the validity of the projection points 44a', 44b', the distance (d) between the projection points 44a', 44b' and the end points (i.e. end indices) 45a' 45b' of the polylines is compared against a threshold (T). If the distance (d) is less than the threshold (T) the image road reference feature 42' is considered to be valid, otherwise invalid.

Moreover, in in the illustrated embodiment of FIG. 5c, the extensions of the polyline are made at the "bottom" part of the polylines, i.e. towards the point of view (vehicle). In some cases, the extensions of the polylines 41a', 41b' may be performed on the upper end, towards the horizon. In such cases, care must be taken such that the polylines 41a', 41b' are not extended beyond the "horizon". Thus, in some embodiments, the validation process comprises checking if any image road reference feature 42' is arranged above the "horizon" in the image, and if so, those image road reference features are discarded. In order to identify the horizon, conventional computer vision techniques may be employed/utilized. Furthermore, the threshold (T) may be a dynamic threshold. For example, if the projection points are within some (pre)defined distance from the horizon, a smaller threshold (T) may be used as compared to if the projection points would be outside of the (pre)defined distance from the horizon. This is at least partly due to the fact that measurements close to the "horizon" are measurements of features that are located further away from the camera, and therefore associated with higher uncertainties. Thus, in order to increase the accuracy of the methods disclosed herein, one may employ dynamic threshold criteria in reference to "distance to horizon" in the image-frame.

Moreover, in in the illustrated embodiment of FIG. 5c, the extensions of the polyline are made at the "bottom" part of the polylines, i.e. towards the point of view (vehicle). In some cases, the extensions of the polylines 41a', 41b' may be performed on the upper end, towards the horizon. In such cases, care must be taken such that the polylines 41a', 41b' are not extended beyond the "horizon". Thus, in some embodiments, the validation process comprises checking if any image road reference feature 42' is arranged above the "horizon" in the image, and if so, those image road reference features are discarded. In order to identify the horizon, conventional computer vision techniques may be employed/utilized. Furthermore, the threshold (T) may be a dynamic threshold. For example, if the projection points are within some (pre)defined distance from the horizon, a smaller threshold (T) may be used as compared to if the projection points would be outside of the (pre)defined distance from the horizon. This is at least partly due to the fact that measurements close to the "horizon" are measurements of features that are located further away from the camera, and therefore associated with higher uncertainties. Thus, in order to increase the accuracy of the methods disclosed herein, one may employ dynamic threshold criteria in reference to "distance to horizon" in the image-frame.

Figure 5D:
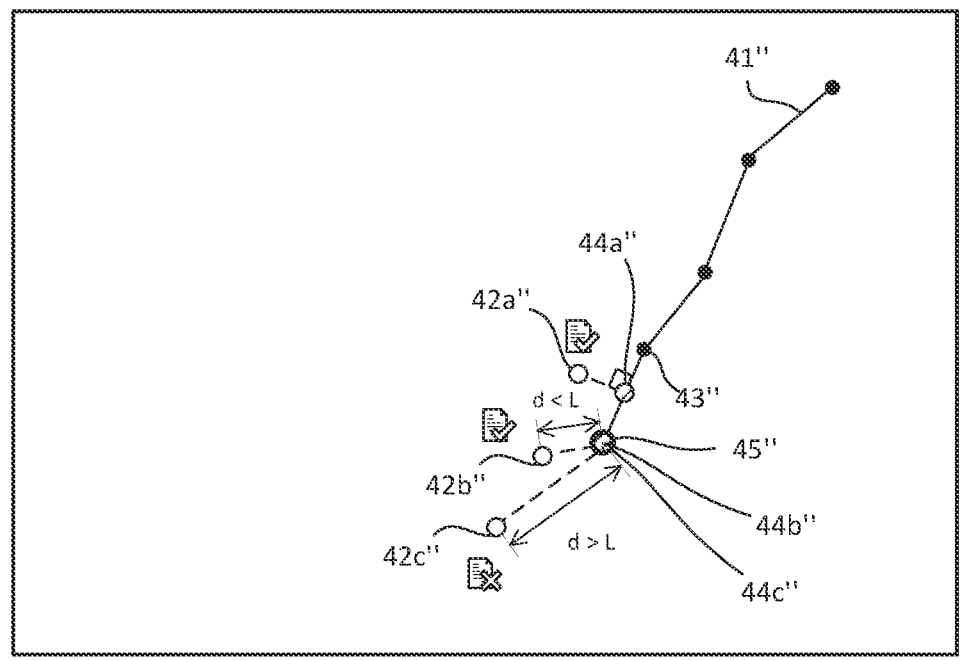
FIG. 5d is a schematic illustration of a transformed set of map road references forming one polyline and corresponding image road references that are projected onto the polyline for a validation process in accordance with an embodiment of the present invention.

Yet further, another alternative validation process of the identified set of image road reference features 42" is illustrated in FIG. 5d.

Even though only one polyline 41" is illustrated in FIG. 5d, the skilled reader readily understands that the same validation process can be performed across multiple polylines as exemplified in the foregoing. Here, three image road reference 42a", 42b", 42c" are identified and projected onto the polyline 41". A first image road reference feature 42a" has an orthogonal projection point 44a" onto the polyline, and is considered to be a valid image road reference. A second and a third image road reference feature 42b", 42c" have no orthogonal projection points onto the polyline 41". However, for such image road reference features, in some embodiments, the validity of the image road reference feature is checked by comparing a distance (d) between the image road reference feature 42b", 42c" and the closest end point (i.e. end index) 45" of the polyline 41" against a threshold distance (L). If the distance (d) is less than the threshold (L) the image road reference feature is considered to be valid, otherwise invalid.

Additionally, in some embodiments, there is another criteria for an image road reference to be considered to be valid. For example, even if the distance (d) between the third image road reference 42c" would be below the threshold (L), it would still be considered to be invalid since the closest end point 45" of the polyline already has an associated "projection point" (from the second image road reference feature 42b"). In other words, if an image road reference feature 44a", 44b" 44c" does not have any orthogonal projection points onto the polyline, one can project the image road reference feature onto the closest end point of the polyline 41 (unless it is already "occupied" by another projection point), and then verify the image road reference feature by comparing the distance (d) against a threshold (L). Analogously as described above, the threshold (L) may be dynamically set based on the distance between the relevant image road reference feature and the "horizon" in the image. Thus, if an image road reference feature is "close" to the horizon a smaller threshold (L) is employed in order to verify/validate that image road reference feature as compared to some other image road reference feature, further away from the horizon.

The present inventors realized that currently known vehicle localization modules which utilize "prediction and measurement update" methodology suffer a technical drawback in that the measurement updates are performed in the ego-frame coordinate system. In more detail, in order to perform the measurement update in the ego-frame coordinate system, the 2D road reference features that are acquired by the vehicle-mounted camera need to be projected from the image-frame coordinate system to the ego-frame coordinate system by utilizing mono-depth estimation, e.g. by utilizing a Convolutional Neural Network (CNN). However, depth errors in the mono-depth estimation will then be propagated into the ego-frame measurement update. Additionally, if multiple vehicle-mounted cameras are employed (e.g. both front-looking and rear-looking cameras) then multiple mono-depth errors are propagated into the ego-frame measurement update.

Accordingly, by means of the herein proposed vehicle localization method/module, the "camera measurements" are maintained in the image-frame coordinate system, and the need for mono-depth estimators is alleviated, resulting in a more accurate vehicle localization. Moreover, the formation of polylines from the transformed map road references provide further advantages in terms of robustness and accuracy.

Executable instructions for performing these functions are, optionally, included in a non-transitory computer-readable storage medium or other computer program product configured for execution by one or more processors.

FIG. 6 is a schematic side view of a vehicle 1 comprising a device 10 for determining a vehicle pose (may also be referred to as a vehicle localization module). The vehicle 1 further comprises a perception system 6 and a localization system 5. A perception system 6 is in the present context to be understood as a system responsible for acquiring raw sensor data from on sensors 6a, 6b, 6c such as cameras, LIDARs and RADARs, ultrasonic sensors, and converting this raw data into scene understanding. In particular, the vehicle 1 has at least one vehicle-mounted camera 6c for capturing images of (at least a portion of) a surrounding environment of the vehicle. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy. Moreover, in the present context the vehicle 1 is assumed to have access to a digital map (e.g. a HD-map), either in the form of a locally stored digital map or via a remote data repository accessible via an external communication network 2 (e.g. as a data stream). In some embodiments, the access to the digital map may for example be provided by the localization system 5.

Further, the vehicle 1 may be connected to external network(s) 20 via for instance a wireless link (e.g. for retrieving map data). The same or some other wireless link may be used to communicate with other vehicles 2 in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The device or localization module 10 comprises one or more processors 11, a memory 12, a sensor interface 13 and a communication interface 14. The processor(s) 11 may also be referred to as a control circuit 11, control unit 11, controller 11, or control circuitry 11. The device 10 preferably comprises a number of software/hardware modules as described in the foregoing, here generalized as "control circuitry" 11. The control circuitry 11 is configured to execute instructions stored in the memory 12 to perform a method for determining a vehicle pose according to any one of the embodiments disclosed herein. Stated differently, the memory 12 of the control system 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, the control circuitry 11 is configured to predict a pose ($x_k$, $y_k$, $\theta_k$) of the vehicle on a map based on sensor data acquired by a vehicle localization system. Further, the control circuitry 11 is configured to transform a set of map road references of a segment of a digital map from a global coordinate system to an image-frame coordinate system of a vehicle-mounted camera based on map data and the predicted pose of the vehicle. The transformed set of map road references form a set of polylines in the image-frame coordinate system. The control circuitry is further configured to identify a set of corresponding image road reference features in an image acquired by the vehicle mounted camera, where each identified image road references feature defines a set of measurement coordinates (xi, yi) in the image-frame. Moreover, the control circuitry 11 is configured to project each of the identified set of road reference features onto the formed set of polylines in order to obtain a set of projection points, wherein each projection point defines a set of projection coordinates (xpi, ypi), determine an error parameter based on a difference between the measurement coordinates and the corresponding projection coordinates, and to update the predicted pose based on the determined error parameter.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 14 may also provide the possibility to acquire sensor data directly or via dedicated sensor control circuitry 4 in the vehicle. The communication/antenna interface 14 may further provide the possibility to send output to a remote location (e.g. remote operator or control centre) by means of the antenna 5. Moreover, some sensors in the vehicle may communicate with the control device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to compare the sensor data (movement of the other vehicle) with the pre-defined behaviour model. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A method for determining a vehicle pose, the method comprising:
   predicting a pose of the vehicle on a map based on sensor data acquired by a vehicle localization system;

transforming a set of map road references of a segment of a digital map from a global coordinate system to an image-frame coordinate system of a vehicle-mounted camera based on map data and the predicted pose of the vehicle, wherein the transformed set of map road references form a set of polylines in the image-frame coordinate system;

identifying a set of corresponding image road reference features in an image acquired by the vehicle-mounted camera, each identified road references feature defining a set of measurement coordinates in the image-frame;

projecting each of the identified set of image road reference features onto the formed set of polylines in order to obtain a set of projection points, wherein each projection point defines a set of projection coordinates;

determining an error parameter based on a difference between the measurement coordinates and the corresponding projection coordinates;

updating the predicted pose based on the determined error parameter; and controlling the vehicle based on the updated pose.

2. The method according to claim 1, wherein the step of transforming the set of map road reference comprises:

converting the set of map road references of the segment of the digital map from the global coordinate system into an ego-frame coordinate system of the vehicle based on map data and the predicted pose; and transforming the converted set of map road references of the segment from the ego-frame coordinate system to the image-frame coordinate system based on a set of calibration parameters of the vehicle-mounted camera.

3. The method according to claim 2, wherein the calibration parameters include a set of camera extrinsic parameters and a set of camera intrinsic parameters.

4. The method according to claim 1, wherein the step of predicting a pose of the vehicle comprises predicting a pose of the vehicle on a map based on sensor data acquired by the vehicle localization system and a predefined vehicle motion model.

5. The method according to claim 1, wherein the step of projecting the identified set of image road reference features comprises:

for each identified image road reference feature, defining a closest index of each polyline relative to the image road reference feature as the projection point for that image road reference feature.

6. The method according to claim 5, further comprising:

validating the identified set of image road reference features by:

for each image road reference feature, discarding the image road reference features and the associated projection points if one of the associated projection points is a non-orthogonal projection point;

wherein the determination of the error parameter is only based on a difference between the measurement coordinates of validated road reference features and the corresponding projection coordinates.

7. The method according to claim 1, wherein the step of predicting the pose of the vehicle comprises:

predicting the pose of the vehicle using a Bayesian filter.

8. The method according to claim 1, wherein the step of predicting the pose of the vehicle comprises perturbing an estimated current vehicle pose and propagating the perturbed vehicle pose; and wherein the transformation of the set of map road references are based on the perturbed vehicle poses.

9. The method according to claim 8, wherein the perturbing an estimated current vehicle pose and propagating the perturbed vehicle poses is based on prediction and measurement models of a Cubature Kalman Filter, and wherein the perturbed vehicle poses correspond to cubature points.

10. The method according to claim 1, further comprising:

selecting the segment of the digital map based on the predicted pose of the vehicle and a set of properties of the vehicle-mounted camera.

11. A non-transitory computer-readable storage medium storing one or more instructions configured to be executed by one or more processors of a vehicle localization module, the one or more instructions for performing the method according to claim 1.

12. A device for determining a vehicle pose, the device comprising control circuitry configured to:

predict a pose of the vehicle on a map based on sensor data acquired by a vehicle localization system;

transform a set of map road references of a segment of a digital map from a global coordinate system to an image-frame coordinate system of a vehicle-mounted camera based on map data and the predicted pose of the vehicle, wherein the transformed set of map road references form a set of polylines in the image-frame coordinate system;

identify a set of corresponding image road reference features in an image acquired by the vehicle-mounted camera, each identified image road references feature defining a set of measurement coordinates in the image-frame;

project each of the set of identified road reference features onto the formed set of polylines in order to obtain a set of projection points, wherein each projection point defines a set of projection coordinates;

determine an error parameter based on a difference between the measurement coordinates and the corresponding projection coordinates;

update the predicted pose based on the determined error parameter; and control the vehicle based on the updated pose.

13. A vehicle comprising:

a localization system for monitoring a position of the vehicle;

a vehicle-mounted camera for capturing images of a surrounding environment of the vehicle;

a device for determining a vehicle pose, the device comprising control circuitry configured to:

predict a pose of the vehicle on a map based on sensor data acquired by a vehicle localization system;

transform a set of map road references of a segment of a digital map from a global coordinate system to an image-frame coordinate system of a vehicle-mounted camera based on map data and the predicted pose of the vehicle, wherein the transformed set of map road references form a set of polylines in the image-frame coordinate system;

identify a set of corresponding image road reference features in an image acquired by the vehicle-mounted camera, each identified image road references feature defining a set of measurement coordinates in the image-frame;

project each of the set of identified road reference features onto the formed set of polylines in order to obtain a set of projection points, wherein each projection point defines a set of projection coordinates;

determine an error parameter based on a difference between the measurement coordinates and the corresponding projection coordinates
update the predicted pose based on the determined error parameter; and
control the vehicle based on the updated pose.

* * * * *